June 11, 1968   J. P. GORYS ET AL   3,387,409
INTEGRATED TRIM PANEL AND WEATHERSTRIP ASSEMBLY
Filed March 24, 1967   2 Sheets-Sheet 1
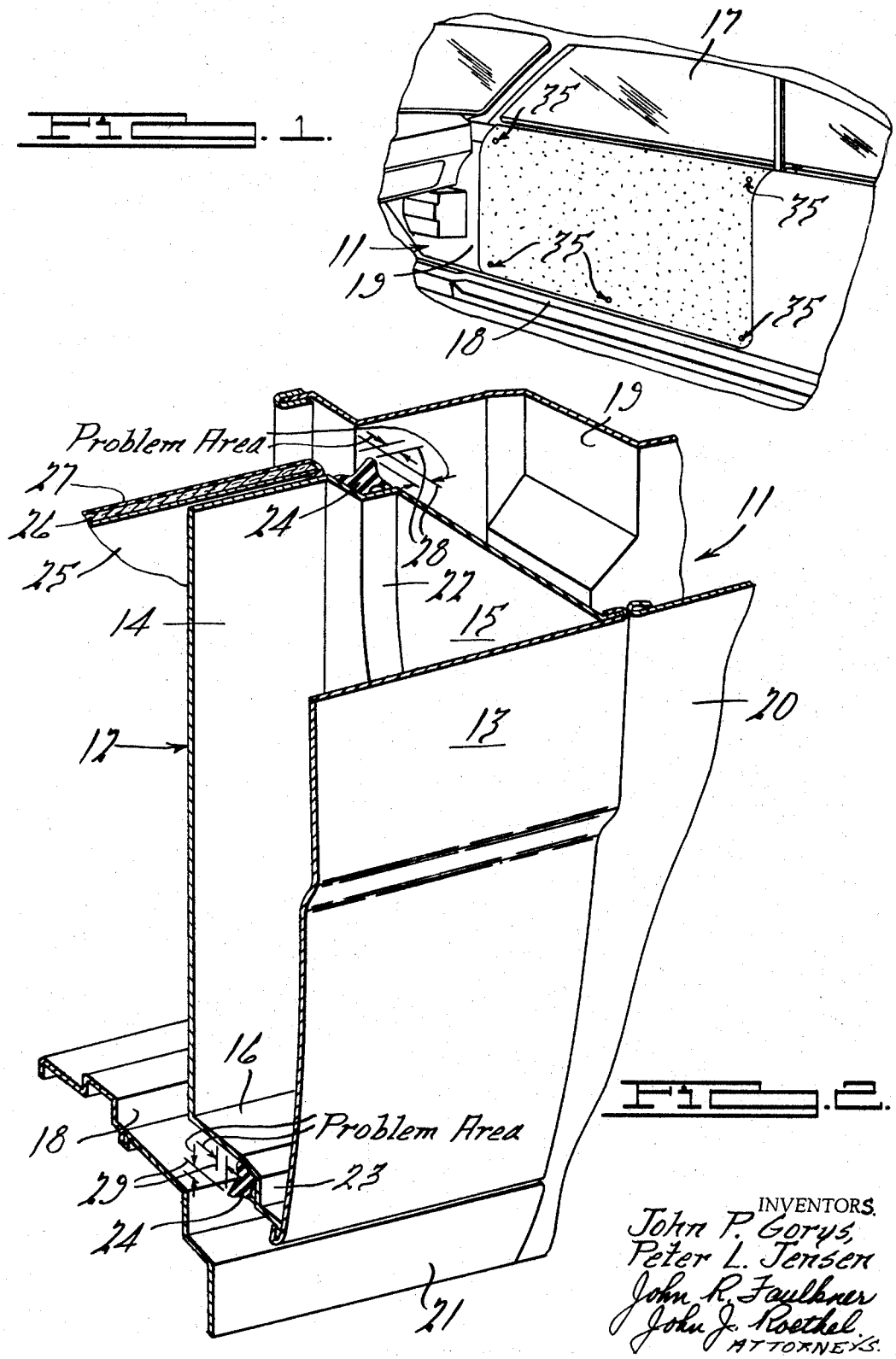
INVENTORS.
John P. Gorys,
Peter L. Jensen
John R. Faulkner
John J. Roethel
ATTORNEYS.

June 11, 1968   J. P. GORYS ET AL   3,387,409
INTEGRATED TRIM PANEL AND WEATHERSTRIP ASSEMBLY
Filed March 24, 1967   2 Sheets-Sheet 2
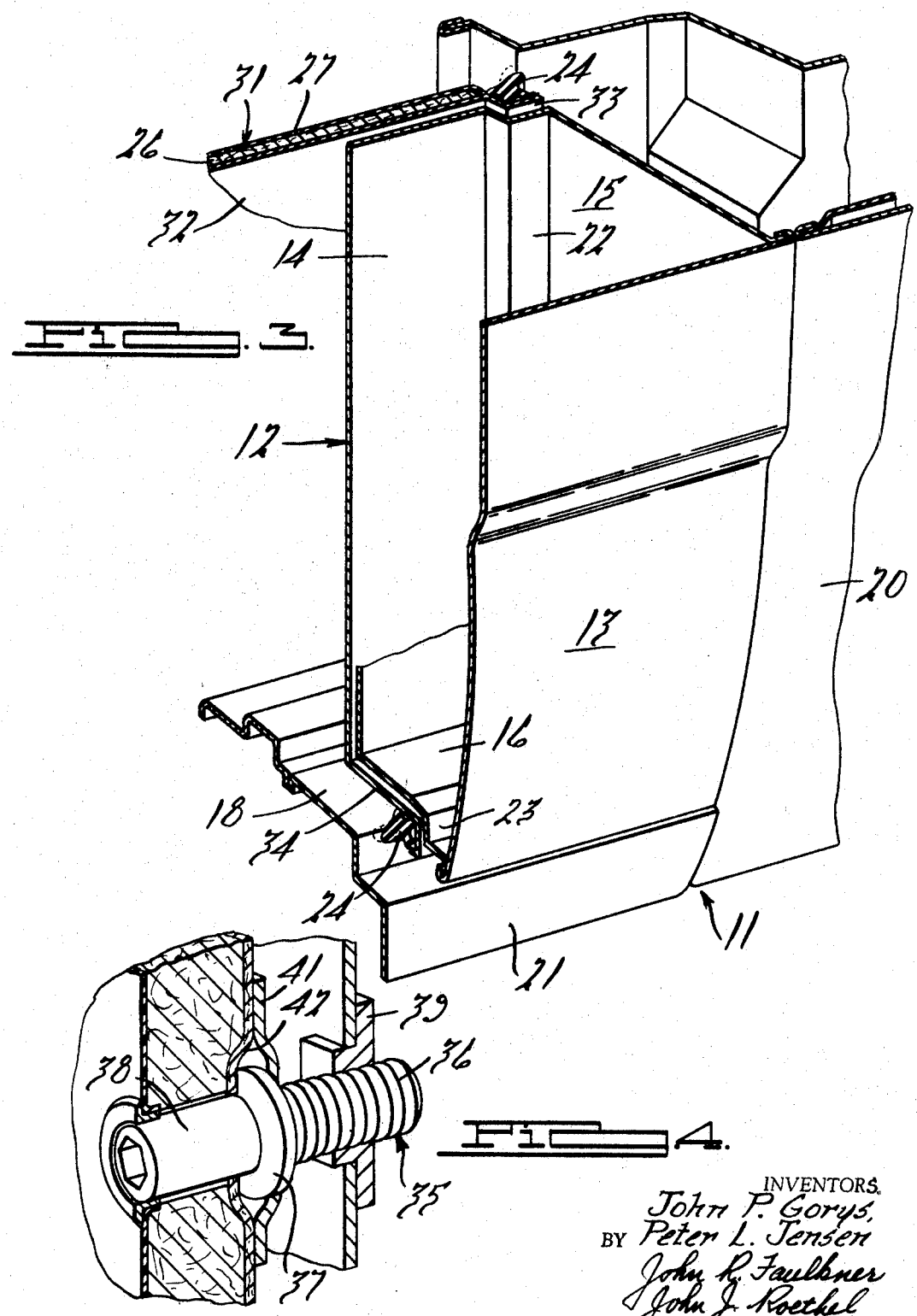
INVENTORS.
John P. Gorys,
BY Peter L. Jensen
John R. Faulkner
John J. Roethel
ATTORNEYS.

United States Patent Office 3,387,409
Patented June 11, 1968

3,387,409
INTEGRATED TRIM PANEL AND
WEATHERSTRIP ASSEMBLY
John P. Gorys, Detroit, and Peter L. Jensen, Livonia,
Mich., assignors to Ford Motor Company, Dearborn,
Mich., a corporation of Delaware
Filed Mar. 24, 1967, Ser. No. 625,859
8 Claims. (Cl. 49—486)

ABSTRACT OF THE DISCLOSURE

An integrated trim panel and weatherstrip assembly for a vehicle door. The trim panel is supported for adjustment relative to the door for positioning the integral weatherstrip in sealing contact with the adjacent surfaces of the vehicle body members defining the door opening.

Background of the invention

The conventional vehicle body comprises a plurality of formed sheet metal structural members which are welded or otherwise fastened together to form the body structure. The body structure is provided with suitable openings to receive the doors and windows. The doors to be fitted in the door openings comprise sheet metal panels which are stamped, formed and welded together to form a shell into which the various window raising and lowering mechanisms, door latch controlling mechanisms and other accessories are received. The door may be considered as an outer panel and an inner panel which are joined by laterally extending peripheral flanges. The outer panel is usually finished on its exterior surface with a coat of paint to match the exterior surfaces of the other body panels. The inner panel is generally covered with a trim panel of suitable fabric or plastic materials.

Because of manufacturing tolerances there are usually substantial gaps between the peripheral surfaces of the door and the adjacent surfaces of the body structure members defining the door opening. This gap is filled by a weatherstrip of resilient material.

The major consideration in fitting a vehicle door in the body opening is to ensure that the outer panel lies in flush relationship with the adjacent outer panels of the vehicle body. This is usually accomplished by adjustment of the hinge supports inwardly, outwardly, up or down as may be required. It has been found that the ideal alignment of the outer door and body panels frequently results in a gap between the surface of the body and the weatherstrip so that the latter in closed position of the door fails to provide a weather tight seal. It then becomes necessary to either compromise the fit of the door within the body opening or to replace the weather seal with an oversize strip. The present invention avoids the problem of weatherstrips which do not contact the adjacent body surfaces when the door and body panels are in flush relationship.

Summary of the invention

As in conventional vehicle construction, the present invention embodies a vehicle body having body members defining a door opening to receive a door structure. The door structure comprises an outer panel and an inner panel joined in spaced relationship to one another by laterally extending peripheral flange portions. When the door is mounted in the body opening, the flange portions are in spaced relationship to opposing surfaces of the body members. The inner panel of the door, which generally is a rough unfinished surface provided with access openings so that the mechanisms mounted within the door can be reached for service and adjustment, is covered by a trim panel.

In accordance with the present invention, the trim panel is provided with flange means overlying adjacent portions of the door flange portions and projecting into the spaces between the latter and the adjacent surfaces of the body members. A weatherstrip means is supported on the trim panel flange means to project toward the adjacent surfaces of the body members. This distinguishes over the prior art in which the weatherstrip is carried on the door flanges. The trim panel is attached to the door structure by adjusting means which permit adjustments of the trim panel to position the weatherstrip means in contact with the surfaces of the body members.

With the present invention, the outer panel of the door may be fitted in its most optimum flush relationship with the other panels of the vehicle body without immediate regard for the fit of the weatherstrip relative to the body members. After the door is suitably positioned, the trim panel then may be adjusted relative to the door structure so that the weatherstrip will engage and provide a tight seal with the adjacent body members so as to form a weather tight fit across any gaps between the door and the body members.

Description of the drawing

Other objects, advantages and features of the present invention will be made more apparent as this description proceeds, reference being had to the accompanying drawings, wherein:

FIG. 1 is a fragmentary perspective view of the interior of a vehicle body looking in the direction of the trim panel mounted on the vehicle door;

FIG. 2 is a fragmentary perspective view illustrating the problem areas which arise in mounting a vehicle door in the vehicle body opening;

FIG. 3 is a fragmentary perspective view illustrating the manner in which the present invention overcomes the difficulties in providing a tight seal around the door; and FIG. 4 is a fastening device adapted to support the trim panel on the door structure.

Description of the preferred embodiment

Referring now to FIGURE 1 of the drawings, there is shown generally at 11 a portion of a vehicle body as it appears from the inside looking outwardly toward a door 12. As shown in FIG. 2, the door 12 comprises an outer panel 13 and inner panel 14, the inner panel having peripheral flange portions as at 15 and 16. The flange portions, such as the flange portions 15 and 16, join the outer panel 13 to the inner panel 14 and form a well therebetween to receive a window regulator mechanism for raising and lowering the window 17, a door latch mechanism and other accessory items usually housed within the vehicle door.

The vehicle body has body members, such as the sill member 18 and the door jamb forming member 19, which define the door opening into which the door 12 is adap'ed to be fitted. The door 12 is swingably mounted in the door opening by suitable hinge means (not shown).

The vehicle door must be mounted within the body opening so that the door outer panel 13 is in a flush relationship with the adjacent body panel 20 and with the rocker panel 21 beneath the door.

As shown in FIG. 2, the conventional vehicle door peripheral flanges 15 and 16 are stepped as at 22 and 23, respectively, the corners formed by the steps having mounted therein a resilient weatherstrip indicated at 24. The inner panel 14 of the door 12 is covered by a trim panel which conventionally comprises a laminated assembly having a base portion of light gauge sheet metal, fiber board or other rigid backing material 25 covered by a resilient padding material which may be a fibrous or foam rubber type material indicated at 26. The padding material 26 in turn is covered by an ornamental facade 27 which may be a fabric or vinyl material.

Because of the manufacturing tolerances involved in the building of an automobile body, the conventional method of supporting the weatherstrip 24 on the fixed flange 15 or 16 of the door creates problem areas as indicated by the legends on FIG. 2. That is, when the outer panel 13 of the door is suitably aligned with the body panels 28 and 21, the weatherstrip 24 may fail to contact the opposing body member surfaces such as the sill 18 and door jamb 19 surfaces. The weather tight integrity of the vehicle body is thus affected. The extend or range in which weatherstrip contact may be missed in either a fore and aft direction or in an in and out direction is indicated by the arrows and lines indicating the projection of the body member surfaces and the edge of the weatherstrip as at 28 and 29. It is apparent that the only way that the problem area gaps can be closed is by removing the weatherstrip and placing a larger one on the door flanges or by sacrificing the desired flush alignment of the outer panel 13 with the body panels 19 and 21 by moving the door inwardly. The present invention, however, offers a solution for this problem and reference is made to FIGS. 3 and 4 for the manner in which this is accomplished.

As can be seen in FIG. 3, no change is made to the vehicle body structure defining the body opening in which the door is mounted. Further, no major change is made to the door 12 itself, the latter still comprising an outer panel 13, an inner panel 14 and the peripheral flanges 15 and 16 joining the inner and outer panels in spaced relationship to each other. There is an important difference, however, in the trim panel herein designated 31. The trim panel 31 comprises a fiber board, sheet metal or other rigid backing material 32 which is provided at its peripheral edges with stepped flanges, such as the vertical flange 33 and the horizontal flange 34. The padding material which forms the trim panel laminate is similar to the padding material 26, as is the facade material 27 of the conventional embodiment as shown in FIG. 2.

The stepped flanges 33 and 34 are adapted to overlie the adjacent peripheral flange portions of the door, such as the door flange portions 15 and 16. The trim panel flanges 33 and 34 project into the spaces between the door flange portions and the adjacent surfaces of the body members, such as the adjacent surfaces of the body sill 18 and the body jamb portion 19. The weatherstrip 24 is mounted in the weatherstrip receiving corners formed by the stepped flange portions of the trim panel assembly rather than being directly attached to the door flanges.

In the conventional construction and arrangement shown in FIG. 2, the trim panel would be retained on the inner panel 14 of the door 12 by snap fasteners or other devices which would permit removal of the panel but not adjustment of the panel relative to the door. With the present invention, suitable retaining devices permitting trim panel adjustments, such as the retaining device generally designated 35 shown in FIG. 4, are provided to support the trim panel on the inner panel of the door.

The retaining device 35 comprises an elongated stud having a threaded end portion 36, an enlarged flange or collar portion 37 intermediate its ends and an extension portion 38 adapted to receive the end of a socket wrench or other tool for turning the threaded portion 36 into a retaining nut 39. The retaining nut 36 is suitably atached to or held in the door panel 14.

The attachment device 35 may be preassembled to the trim panel 31 as by means of a retaining plate 41 which holds the collar portion 37 of the attachment device 35 in a pocket 42 in the panel 32.

With the foregoing construction and arrangement, the trim panel 31 is spaced from the inner panel of the door and may be moved inwardly or outwardly relative to the door panel. The range of movement of the panel is, of course, limited by the amount of thread on the threaded end of the attachment device 35, but this can be readily designed to accommodate the maximum permissible manufacturing tolerance or gap permitted between opposing surfaces of the door flanges and the body member adjacent surfaces.

As shown in FIG. 1, a plurality of attachment devices 35 are provided to support the trim panel on the inner panel of the door. It will be understood that the trim panel will have attached thereto an arm rest structure and also that the door handle and window regulator handles will project from the surfaces of the trim panel but these are not shown since they form no part of the present invention.

It will be understood that the invention is not to be limited to the exact construction shown and described, but that various changes and modifications may be made without departing from the spirit and scope of the invention, as defined in the appended claims.

We claim:
1. A vehicle body door structure comprising an outer panel and an inner panel joined in spaced relationship to one another by laterally extending flange portions,
 a trim panel overlying said inner panel,
 said trim panel having flange means overlying adjacent portions of said door flange portions,
 weatherstrip means supported on said trim panel flange means,
 and adjusting means mounting said trim panel on said door structure for adjustment of the trim panel relative to said outer panel to position the weatherstrip means supported thereon for sealing contact with body frame members defining an opening in which said door is adapted to be mounted.

2. In a vehicle body door structure according to claim 1, in which:
 the adjusting means supports said trim panel in spaced relationship to the inner panel of the door for movement of the trim panel toward or away from the outer panel of the door.

3. In a vehicle body door structure according to claim 2, in which:
 the adjusting means comprises an attachment device having a body portion journalled for rotation in the trim panel and a threaded portion threadedly engaging a nut means carried by the inner panel of the door.

4. The vehicle body door structure according to claim 3, in which:
 the attachment means comprises a plurality of attachment devices permitting independent adjustment of various portions of the trim panel so that the weatherstrip means can be positioned to provide substantially uniform sealing pressure around the perimeter of the door.

5. In a vehicle body having body members defining a door opening,
 a door structure mounted in said opening comprising an outer panel and an inner panel joined in spaced relationship to one another by laterally extending flange portions,
 said flange portions being in spaced relationship to opposing surfaces of said body members,
 a trim panel overlying said inner panel,
 said trim panel having flange means overlying adjacent portions of said door flange portions and projecting into the spaces between the latter and the adjacent surfaces of the body members,
 weatherstrip means supported on said trim panel flange means to project toward said surfaces of said body members,
 and adjusting means attaching said trim panel to said door structure for adjustment of the trim panel to position the weatherstrip means in contact with said surfaces of said body members.

6. In a vehicle body according to claim 5, in which:
 the adjusting means supports said trim panel in spaced relationship to the inner panel of the door for movement of the trim panel toward or away from the outer panel of the door.

7. In a vehicle body according to claim 6, in which: the adjusting means comprises an attachment device having a body portion journalled for rotation in the trim panel and a threaded portion threadedly engaging a nut means carried by the inner panel of the door.

8. In a vehicle body according to claim 7, in which: the attachment means comprises a plurality of attachment devices permitting independent adjustment of various portions of the trim panel so that the weatherstrip means can be positioned to provide substantially uniform sealing pressure around the perimeter of the door.

References Cited

UNITED STATES PATENTS

| | | | |
|---|---|---|---|
| 2,160,636 | 5/1939 | Ball | 52—511 X |
| 2,198,069 | 4/1940 | Widman | 49—502 X |
| 2,650,857 | 9/1953 | Watter et al. | 49—502 |
| 2,797,130 | 6/1957 | Renno | 49—502 |
| 3,037,596 | 6/1962 | Fordyce | 52—511 |

DAVID J. WILLIAMOWSKY, *Primary Examiner.*

PHILIP C. KANNAN, *Assistant Examiner.*